US008787973B2

(12) United States Patent
Agami et al.

(10) Patent No.: US 8,787,973 B2
(45) Date of Patent: Jul. 22, 2014

(54) DEVICE AND METHOD FOR CONTROLLING USAGE OF A MEMORY CARD

(75) Inventors: Mishael Agami, Netanya (IL); Eitan Mardiks, Raanana (IL)

(73) Assignee: SanDisk IL Ltd., Kfar Saba (IL)

( * ) Notice: Subject to any disclaimer, the term of this patent is extended or adjusted under 35 U.S.C. 154(b) by 407 days.

(21) Appl. No.: 11/636,540

(22) Filed: Dec. 11, 2006

(65) Prior Publication Data
US 2007/0218945 A1  Sep. 20, 2007

Related U.S. Application Data

(60) Provisional application No. 60/783,593, filed on Mar. 20, 2006.

(51) Int. Cl.
*H04B 1/38* (2006.01)
*H04W 8/18* (2009.01)
*H04W 88/02* (2009.01)
*H04W 12/06* (2009.01)

(52) U.S. Cl.
CPC .............. *H04W 8/183* (2013.01); *H04W 88/02* (2013.01); *H04W 12/06* (2013.01)
USPC ......................................... 455/558; 455/410

(58) Field of Classification Search
CPC ................................................... H04W 12/06
USPC ................................................ 455/410, 558
See application file for complete search history.

(56) References Cited

U.S. PATENT DOCUMENTS

| 6,202,051 B1 | 3/2001 | Woolston |
| 6,202,056 B1 | 3/2001 | Nuttall |
| 6,229,894 B1 | 5/2001 | Van Oorschot et al. |

(Continued)

FOREIGN PATENT DOCUMENTS

| DE | EP 1548667 | 6/2005 |
| EP | 1 220 544 A1 | 7/2002 |

(Continued)

OTHER PUBLICATIONS

"Content Protection for Recordable Media Specification" SD Memory Card Book Intel Corporation International Business Machines Corporation Matsushita Electric Industrial Co. Ltd. Toshiba Corporation May 28, 2001 pp. 1-75.

(Continued)

*Primary Examiner* — David Bilodeau
(74) *Attorney, Agent, or Firm* — Brinks Gilson & Lione

(57) ABSTRACT

A memory card includes a memory for storing data and a controller that is operative to control access to storage of at least a portion of storage conditional upon an authorization of a corresponding identity card of a service provider. A storage system includes an identity card of a service provider and a memory card, wherein the identity card corresponds to the memory card, and wherein access to storage of at least a portion of the memory card is controlled conditional upon an authorization from only this corresponding identity card. A method of doing business includes equipping a mobile phone with an identity card that corresponds to a memory card, configuring the memory card to operate conditional on an authorization from this corresponding secured card, and then offering the mobile phone and the memory card for sale at a discount.

27 Claims, 5 Drawing Sheets

(56) References Cited

U.S. PATENT DOCUMENTS

| | | | |
|---|---|---|---|
| 6,389,538 B1 | 5/2002 | Gruse et al. | |
| 2002/0187808 A1* | 12/2002 | Vallstrom et al. | 455/558 |
| 2003/0050050 A1 | 3/2003 | Higuchi et al. | |
| 2004/0087339 A1* | 5/2004 | Goldthwaite et al. | 455/558 |
| 2004/0157584 A1* | 8/2004 | Bensimon et al. | 455/411 |
| 2005/0070248 A1* | 3/2005 | Gaur | 455/410 |
| 2005/0239505 A1* | 10/2005 | Jeannerod | 455/558 |
| 2006/0009196 A1* | 1/2006 | Lai et al. | 455/411 |
| 2006/0123106 A1 | 6/2006 | Blair et al. | |
| 2006/0246949 A1* | 11/2006 | Gupta et al. | 455/558 |
| 2009/0054104 A1* | 2/2009 | Borean et al. | 455/558 |

FOREIGN PATENT DOCUMENTS

| | | |
|---|---|---|
| EP | 1 237 323 A1 | 9/2002 |
| EP | EP 1445888 | 8/2004 |
| EP | 1548667 A1 * | 6/2005 |
| JP | 2002-117658 | 4/2002 |
| JP | 2002-197379 | 7/2002 |
| JP | 2002-335578 | 11/2002 |
| JP | EP1278127 | 1/2003 |
| JP | EP 1280149 | 1/2003 |
| JP | 2003-131950 | 5/2003 |
| TW | 560154 | 11/2003 |
| TW | 562189 | 11/2003 |
| WO | 03/034651 A1 | 4/2003 |
| WO | 2004/019585 A1 | 3/2004 |

OTHER PUBLICATIONS

OMA Digital Rights management "OMA Digital Rights Management, DRM Architecture Passage" Jul. 15, 2004 OMA Digital Right Management DRM Architecture pp. 1-24.

C.J. Antonelli, P. Honeyman: "Wiretapping the Internet" SPIE Symposium on Enabling Technologies for Law Enforcement and Security, Held on Nov. 5, 2000, Retrieved from Internet, www.spiedl.com, vol. 4232, Feb. 2001, pp. 75-84, XP002262366.

Office Action issued in U.S. Appl. No. 11/681,792 on Oct. 26, 2009, 13 pages.

Office Action issued in Chinese App. No. 200710087692.8 on Dec. 20, 2009, 9 pages.

Office Action issued in Korean App. No. 10-2007-0026987 on Aug. 31, 2009, 10 pages.

Office Action issued in Korean App. No. 10-2007-0026987 on Jul. 9, 2010, 6 pages.

Office Action issued in EP App. No. 07 104 234.5 on Jul. 19, 2010, 6 pages.

Office Action issued in corresponding Indian Appln. No. 571/CHE/2007 dated Jan. 31, 2011 (2 pgs).

*Decision to refuse a European Patent Application* issued Mar. 17, 2011 in corresponding EP Appln. No. 07 104 234.5 (57 pgs).

*Provision of a copy of the minutes in accordance with Rule 124(4) EPC* issued Mar. 15, 2011 in corresponding EP Appl. No. 07 104 234,5 (45 pgs).

Office Action issued Aug. 10, 2010 in corresponding Japanese Appl. No. 2007-068370 (2 pgs).

Search Report for Patent Application issued in corresponding Taiwan Appln. No. 096108484 dated Oct. 9, 2011 (partial translation) (12 pgs).

Office Action issued in corresponding Chinese Appln. No. 200710087692.8 dated Oct. 10, 2012 (9 pgs).

* cited by examiner

DEVICE AND METHOD FOR CONTROLLING USAGE OF A MEMORY CARD

CROSS-REFERENCE TO RELATED APPLICATIONS

This patent application claims the benefit of U.S. Provisional Patent Application No. 60/783,593, filed Mar. 20, 2006.

FIELD OF THE INVENTION

The present invention relates to the field of memory cards. More particularly, the present invention relates to a method for controlling usage of a memory card.

BACKGROUND OF THE INVENTION

As the use of cellular phones by mobile subscribers is getting more and more profitable to Mobile Network Operators (MNO), there is a growing motivation to limit the use of cellular phone subscribers to a single MNO network.

Existing techniques for limiting the use of mobile subscribers to a single MNO network include configuring a cellular phone with a phone locking mechanism to enable the use of the cell phone only if a compatible SIM (Subscriber Identity Module) card is installed in the cell phone. A SIM card is a smart-card-type device securely storing a private key for identifying a mobile subscriber. The SIM card also includes storage space for storing text messages and telephone numbers.

Many cellular phones used today feature a memory card slot for interfacing with a memory card. A memory card plugged into this slot is a non-volatile memory, typically a flash-based removable memory storage card, which provides the phone with additional storage capacity, typically 16 Mbyte to 1 Gbyte. The additional memory can be used for storing preloaded data and applications, such as pictures, music and games, all of which are supported by the cellular phone's different functionalities.

The memory card is typically sold as an optional accessory and can be purchased from any compatible memory card manufacturer.

A Mobile Network Operator (MNO) may provide a mobile phone to its subscribers at no cost or at a very low cost. The MNO typically limits the use of such a mobile phone by restricting its use to a single MNO network or to the specific subscriber.

Existing techniques for limiting the use of such a mobile phone are typically achieved by implementing a SIM lock mechanism that enables usage of a mobile phone only when the mobile phone is installed with a compatible SIM card that is provided by the MNO together with the mobile phone.

However in situations where service providers may cover the cost of the memory card and also provide the card with preloaded data and applications in order to motivate usage of cellular phone subscribers to their own MNO network, it is highly desirable to limit usage of memory cards to a single MNO network.

SUMMARY OF THE INVENTION

Accordingly, it is a principal object of the present invention to provide a memory card that is configured to operate conditional on authorization from a corresponding compatible secured card for the purpose of limiting the usage of the memory card.

The memory card of the present invention can be used by service providers selling mobile phones in a manner such that the memory card is fully operational only when used in their mobile phones. A service provider may cover the cost of the memory card and also provide the memory card with preloaded data and applications. By offering mobile phones and the memory card of the present invention for sale at a substantially low price (i.e. either at a very low cost or at no charge at all), service providers push users to use their memory cards and as a result increase their sales.

A service provider can limit usage to the memory card by locking access to storage of the memory card as a whole or by locking access to only a partition of the storage. Locking accesses to storage of the memory card results in disabling read, write or both read and write functionalities of the memory card.

Another aspect of the present invention is the capability of a service provider, such as an MNO, to unlock a protected memory card using any network device, such as a mobile network or the Internet. In this case, an MNO subscriber can use his/her protected memory card even if the memory card is not installed in the network device.

It should be emphasized that the novelty of the present invention, in comparison to prior art secured memory cards, is the ability to control the use of storage of at least a portion of the memory card by a user in case the memory card is not authorized from a specific identity card, such as a SIM card, of a particular service provider.

In accordance with the present invention, there is provided a memory card that includes: (a) a memory for storing data; and (b) a controller that is operative to control access to storage of at least a portion of the memory, conditional upon an authorization from a corresponding identity card of a service provider.

Preferably, the identity card is a SIM card. Alternatively, the identity card is a RUIM card.

Preferably, the service provider is a Mobile Network Operator.

Preferably, the controller is operative to control access to the memory according to a user profile that is defined by the service provider. More preferably, the memory card is configured for updating of the user profile by the service provider via wireless communication. Alternatively, the memory card is configured for updating of the user profile by the service provider via wired communication.

Preferably, the storage includes at least one partition, such that control of access is limited to this at least one partition.

Preferably, in one embodiment the control of access includes granting only read access. Alternatively, the control of access includes controlling write operations. Optionally, the control of access includes granting both read access and write access.

Preferably, the authorization is effected in response to connecting the memory card and the corresponding identity card to a common host. More preferably, the host is a mobile phone. Alternatively, the authorization is effected in response to connecting the memory card to a network device. More preferably, the network device is a mobile phone.

In accordance with the present invention, there is further provided a method of controlling operation of a memory card that includes the steps of: (a) providing an identity card, of a service provider, that corresponds to the memory card; and (b) controlling access to storage of at least a portion of the memory card conditional on an authorization from this corresponding identity card of the service provider. Note that access to storage of the memory card is conditional upon authorization from a specific identity card that corresponds to and is compatible with this memory card.

Preferably, the method also includes assigning the memory card a user profile, by the service provider, such that controlling access is effected according to the user profile. More preferably, the method also includes updating the user profile, by the service provider. The updating can be effected either via wireless communication or via wired communication.

Preferably, the storage includes at least one partition, such that controlling of access is limited to this at least one partition.

Preferably, the controlling of access includes the step of authenticating the memory card to the corresponding identity card.

Preferably, the controlling of access includes granting only read access. Alternatively, the controlling of access includes controlling write operations. Optionally, the controlling of access includes granting both read access and write access.

Preferably, the authorization is effected in response to connecting the memory card and the corresponding identity card to a common host. Alternatively, the authorization is effected in response to connecting the memory card to a network device.

In accordance with the present invention, there is also provided a storage system that includes: (a) an identity card of a service provider; and (b) a memory card, wherein the identity card corresponds to the memory card, the memory card includes: (i) a memory for storing data; and (ii) a controller that is operative to control access to storage of at least a portion of the memory, conditional upon an authorization from this corresponding identity card of the service provider. Note that access to storage of the memory is conditional upon authorization from a specific identity card that is configured in correspondence with the memory.

Preferably, the storage system also includes at least one network device, wherein the authorization is effected in response to connecting each of the memory card and the identity card to such a network device. More preferably, the network device includes a mobile phone.

In accordance with the present invention, there is also provided a method of doing business that includes the steps of: (a) equipping a mobile phone with an identity card that corresponds to a memory card; (b) configuring the memory card to operate conditional on an authorization from this corresponding identity card; and (c) offering the mobile phone and the memory card for sale at a discount.

Additional features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding sections or elements throughout, and in which.

DETAILED DESCRIPTION OF THE PREFERRED EMBODIMENTS

The present invention is a memory card that is configured to operate conditional on authorization from a specific secured card for the purpose of limiting the usage of the memory card.

In accordance with one embodiment, the memory card of the present invention is configured to be operational only when installed in a network device, such as a cell phone, that is equipped with a SIM card (of a service provider, such as an MNO) that corresponds to the memory card.

Another aspect of the present invention is the capability of a service provider, such as an MNO, to unlock a protected memory card using any network device, such as a mobile network or the Internet. In this case, an MNO subscriber can use his/her protected memory card even if the memory card is not installed in the network device.

Note that the service provider can define a plurality of secured card to correspond to the memory card of the present invention.

A controller of the memory card is operative to control access to storage of at least a portion of the memory of the memory card conditional upon a confirmation received from the compatible SIM card.

A controller of the memory device is operative to control access to storage in the memory card according to a user profile defined by the service provider. The user profile of the memory card is initially set (for example, by assigning each partition an attribute word) by the service provider to limit access to storage (or to a partition thereof) within the memory card.

The storage within the memory card is defined herein either as an 'un-partitioned storage' having a single partition, or as a 'partitioned storage' having a plurality of partitions.

The user profile of the memory card is set on an unlocked/locked state as a whole, thereby enabling/disabling access to all storage within the memory card. Alternatively, only a partition of the storage of the memory card is set on an unlocked/locked state, thereby enabling/disabling access to only part of the storage.

Setting the memory card, or only a partition thereof, on a locked state results in limiting the memory card functionalities, such as disabling read, write or both read and write functionalities of the memory card.

Note that the user profile can be, at any point of time, updated by the service provider (e.g. MNO) via a wireless communication or via a wired communication.

Figure 1:
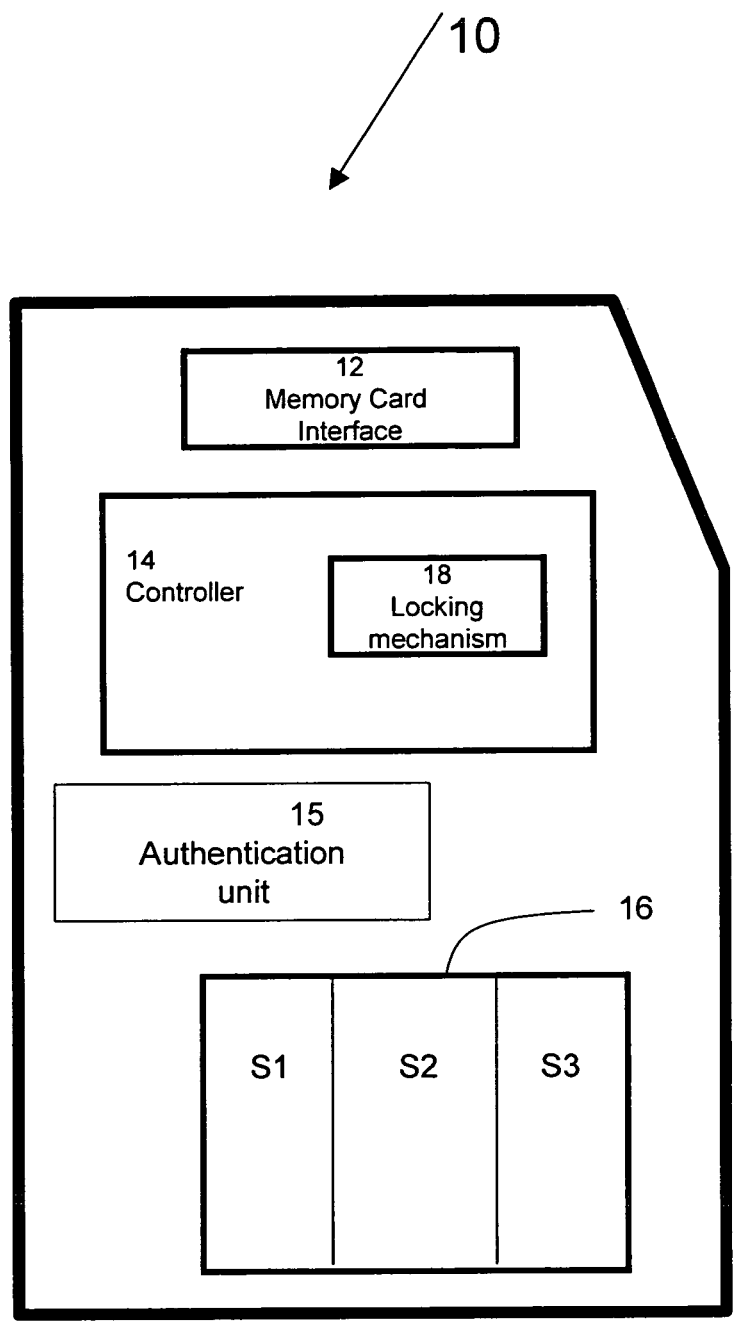
FIG. 1 is a block diagram of a memory card of the present invention.

Referring now to FIG. 1, there is shown is a block diagram of a memory card 10 of the present invention. A Memory card Interface 12 is implemented for communicating with a Host. The Host can be any type of data processing system or subsystem that includes a memory card interface, such as a Cell Phone, a PDA (Personal Digital Assistant), a PC (Personal Computer), etc.

An authentication unit 15 is provided to allow only the owner (or the provider) of the memory card to manage storage unit 16 (e.g. access/format the storage within locked partitions, define new partitions, etc.). The authentication feature is implemented via two encryption keys, as described herein below in FIG. 3.

A Controller 14, operative in response to authentication unit 15, is a processing system used for controlling access to storage of memory card 10.

A Locking mechanism 18, typically embedded within controller 14, is provided as an enhanced logic mechanism for controlling the use of the memory card and limiting access to a storage unit 16 in response to an authentication from a specific secured card.

Controlling operation of the memory card 10 can result, for example, in disabling write operations (i.e. providing read only access to storage stored in Storage unit 16), or in disabling both read and write operations to all the storage or to a partition thereof.

The Locking mechanism 18 is preferably implemented by assigning each partition S1, S2 and S3 of Storage unit 16 a respective attribute word. A typical attribute word includes a read attribute 32 and a write attribute 34 (see FIG. 2).

Storage unit 16 is typically implemented as a flash memory device. Storage unit 16 of this example includes three partitions S1, S2 and S3. Each partition is typically viewed by the Host as an independent logical device. Controller 14 limits access to storage within each partition according to the content that is pre-programmed by the MNO in the attribute word of this partition. The number of partitions and the size of each partition are also defined by the MNO.

Figure 2:
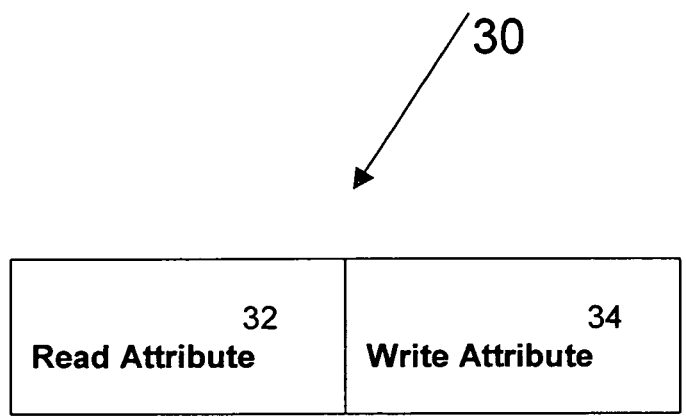
FIG. 2 shows an attribute word that is assigned to each partition of storage unit of the memory card of FIG. 1.

Referring to FIG. 2, there is shown an attribute word 30 that is assigned to each partition of the storage unit 16 of FIG. 1. The collection of attribute words 30, defining the usage profile of the memory card, is implemented either in the memory card (e.g. by reserving storage in each partition of storage unit 16 for that partition's attribute word 30) or in a compatible identification card (e.g. SIM card).

As an example, attribute word 30 includes a read attribute flag 32 and a write attribute flag 34 that are assigned to each partition S1, S2 and S3 (see FIG. 1) to enable/disable read, or read and write operations.

Setting read attribute flag 32 of a corresponding partition on an unlocked state (e.g. "0") allows the user to read storage of this partition, whereas setting read attribute flag 32 on a locked state (e.g. "1") prevents the user from reading storage of this partition. Setting write attribute flag 34 of a corresponding partition on an unlocked state (e.g. "0") allows the user to write data to this partition, whereas setting write attribute flag 34 on a locked state (e.g. "1") programs this partition as read-only to and prevents the user to write to this partition.

Note that the attribute words, defining the usage profile of the memory card, can be updated by the service provider (e.g. MNO) at any point of time via a wireless communication or via a wired communication.

Figure 3:
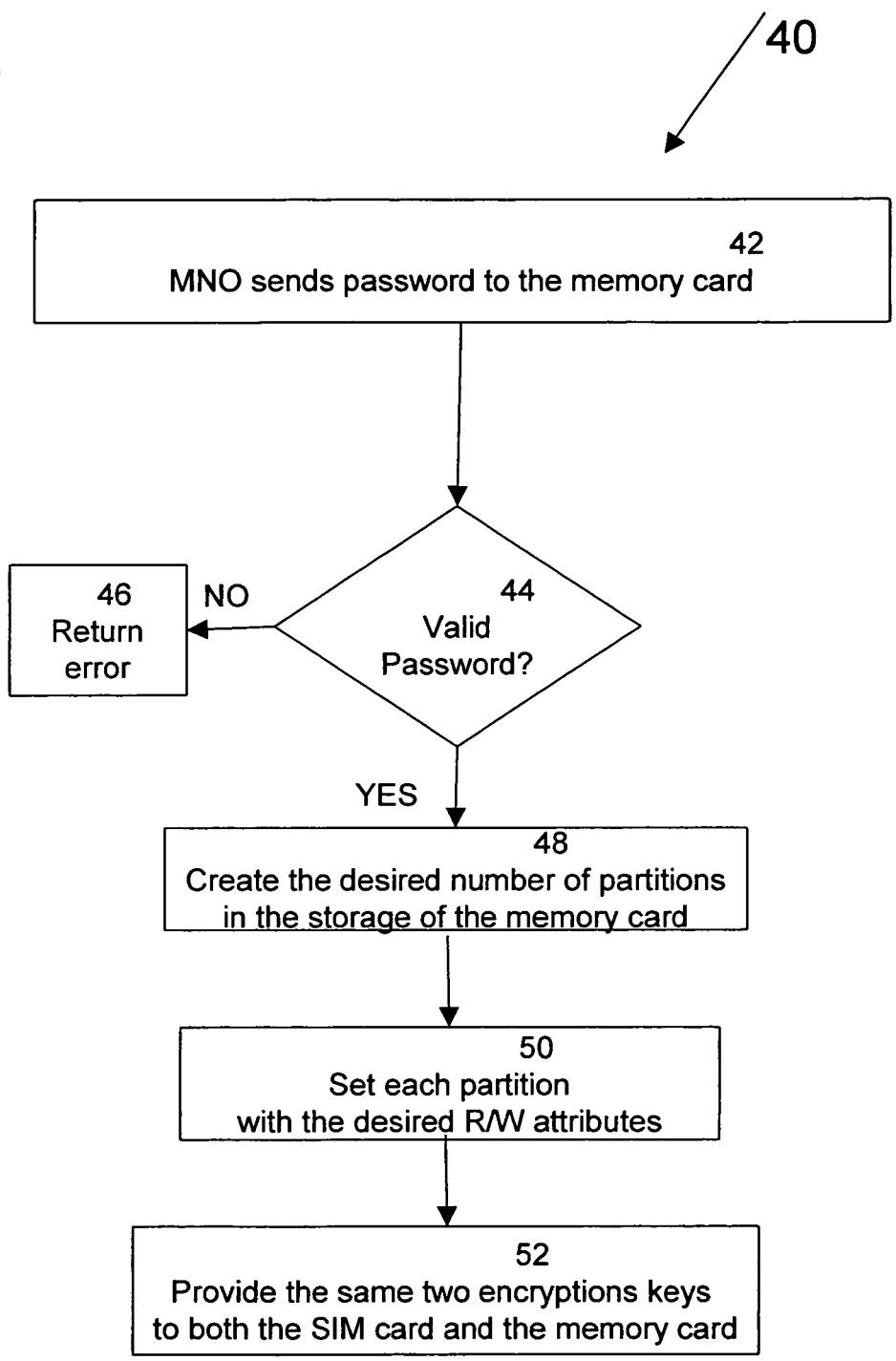
FIG. 3 is a flow chart of a method of the present invention applied by a service provider for initializing the memory card of FIG. 1 with a compatible SIM card.

Referring now to FIG. 3, there is shown a flow chart 40 of a method of the present invention applied by a service provider (such as an MNO) for initializing the memory card 10 with a compatible SIM card. The initialization is performed by the MNO while memory card 10 and the corresponding SIM card are connected to a processing system (e.g. a PC) installed with an application that initializes the memory card to be compatible with this corresponding SIM card and operate according a predefined profile.

At the first step 42, the MNO sends a password to the memory card to begin the initialization process.

At step 44, the received password is verified by the memory card with a password that is preloaded to the memory card. In case the verification fails, step 46, an error command is sent and the initialization is aborted. However, in case the verification succeeds, step 48, the MNO defines the manner in which the storage within the respective memory card is partitioned (e.g. number of partitions, size of each partition) and the method proceeds to step 50.

At step 50, each partition is assigned with a corresponding read and/or write attribute.

At the next step 52, the memory card and corresponding SIM card are both provided with the same two encryption keys (defined herein as Key #1 and Key #2). These two encryption keys are provided for a later use (see FIG. 4) when the memory card is installed in a hosting device. These encryption keys also are stored, with respect to this memory card, in the MNO's database.

Figure 4:
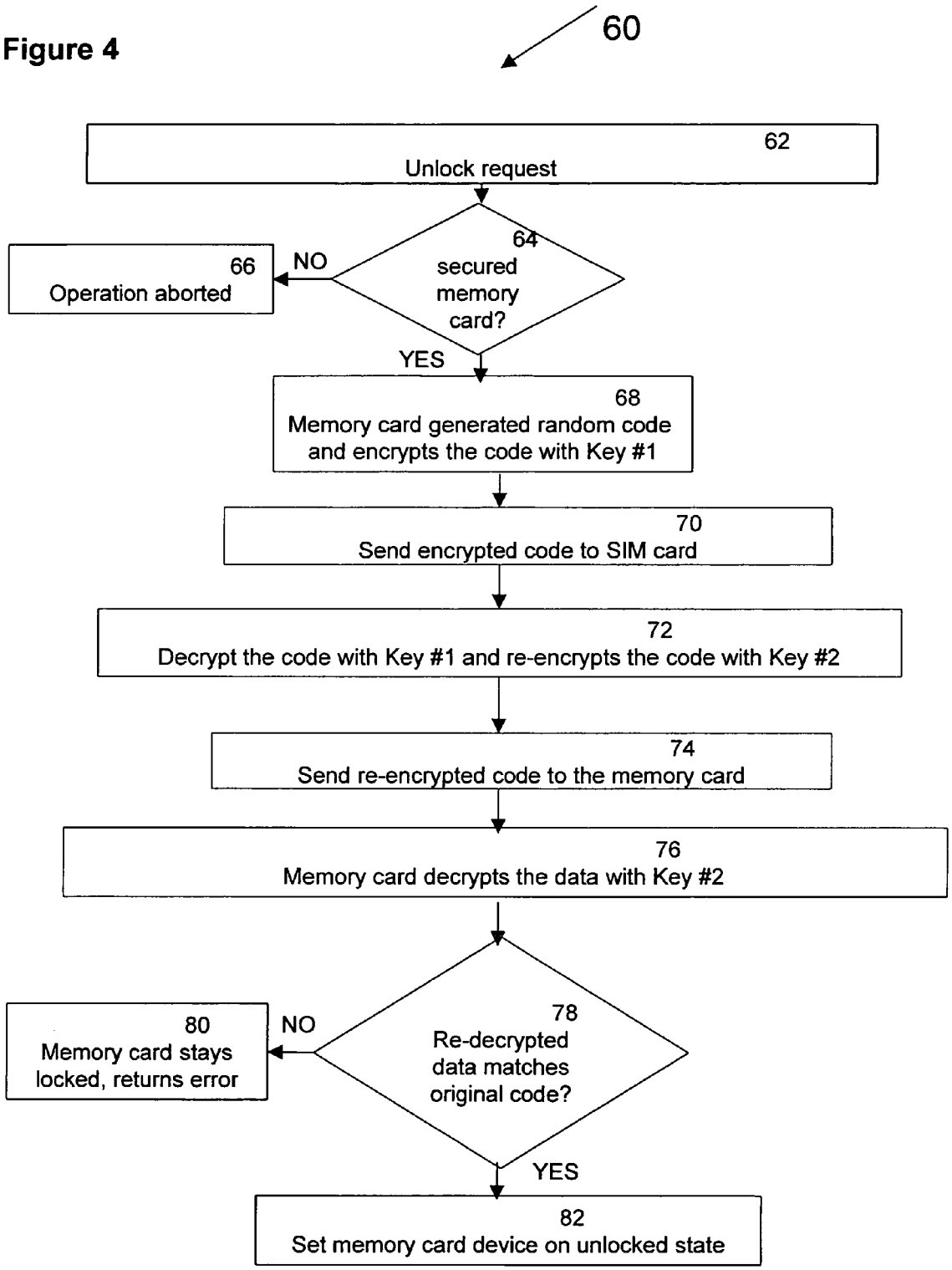
FIG. 4 is a flow chart of a method of the present invention for operating the memory card of the present invention within a mobile phone that is assigned by the MNO to a user.

Referring to FIG. 4 there is shown a flow chart 60 of a method of the present invention for operating the memory card of the present invention within a mobile phone that is assigned by the MNO to a user.

At the initial step 62, an unlock request is issued to the memory card. This request can be issued automatically, for example, upon power up or upon the insertion of the memory card to a slot in a host (e.g. a cell phone) that is equipped with a compatible SIM card.

At the next step 64, it is verified by the SIM card whether this memory card is a memory card initialized with this specific SIM card, according to the method of the present invention. In the negative case, step 66, the request made by the user is not recognized by the memory card, the operation is aborted, and the user may not use the memory card (unless only a partition is locked then the user may use the storage of other partitions of the memory card), in accordance with the implementation of the cell phone.

However in the affirmative case, step 68, a random unlock code is generated by the memory card and then encrypted with a first encryption key that is provided by the MNO (defined herein as Key#1).

At step 70, the encrypted code is sent to the compatible SIM card.

At step 72, the encrypted code is decrypted by the SIM card using Key #1 that is provided to the SIM card by the MNO (step 52 of FIG. 3) and then re-encrypted by the SIM card using a second encryption key that is provided by the MNO (defined herein as Key#2).

At the next step 74, the re-encrypted code is sent to the memory card.

At step 76, the re-encrypted code is re-decrypted by the memory card using Key#2 that is stored in the memory card.

At step 78, it is verified whether the re-decrypted data applied by the memory card using Key#2 matches the random code that was previously generated by the memory card at step 64. In the negative case, step 80, the memory card remains on a locked state and an error command is sent to the host. However in the affirmative case, step 82, the memory card (or a respective partition) is set on an unlocked state and is enabled for the subscriber to use.

Note that only a SIM card configured with the same two encryption keys (Key#1 and Key#2) that are stored in the memory card is compatible to instruct a host to set the memory card on an unlocked state in step 82.

It should be noted that the method described herein above in FIG. 4 is brought here as an example only. Other methods for operating the memory card of the present invention in addition to the usage of the memory card within a mobile phone, such as installing the memory card within an Internet-enabled host (see FIG. 5B), are equally applicable.

Figure 5A:
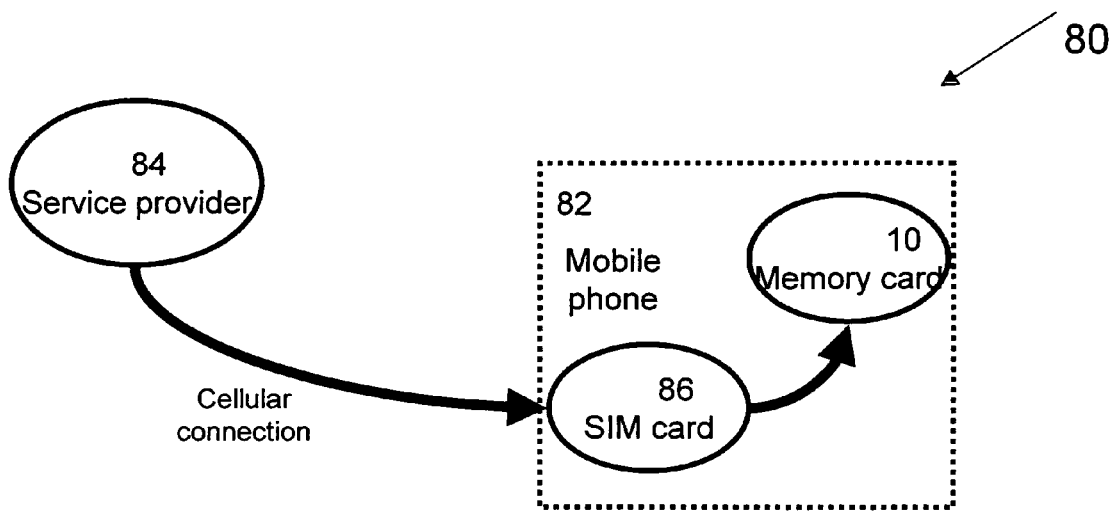
FIG. 5A is a schematic illustration of a manner of operating the memory card of the present invention when inserted to a mobile phone, according to a first mode of operation.

Referring to FIG. 5A, there is shown a schematic illustration 80 of the manner in which the memory card of the present invention is operated when resided in a mobile phone 82, according to a first mode of operation. A host (e.g. a mobile phone 82) hosts the memory card 10 and a compatible SIM card 86. In this case, mobile phone 82 is employed as a mediator, such that the memory card 10 is authorized by the SIM card 86 using the software and hardware of the mobile phone. The SIM card 86 communicates with a server of a service provider 84, such as an MNO, via the cellular network. For example, service provider 84 can update the user profile of memory card 10 via the cellular connection.

Figure 5B:
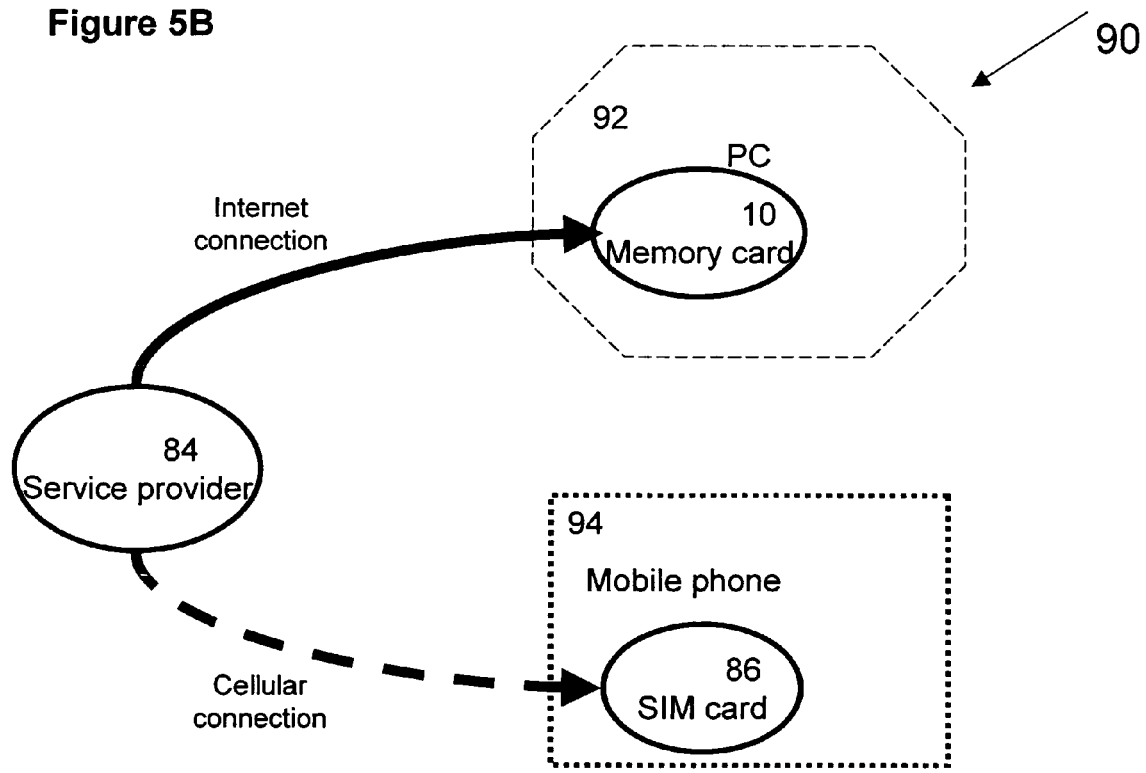
FIG. 5B is a schematic illustration of a manner of operating the memory card of the present invention when installed within an Internet-enabled host (such as a PC), according to a second mode of operation.

Referring to FIG. 5B, there is shown a schematic illustration 90 of the manner in which the memory card of the present invention is operated when installed within an Internet-enabled host (such a PC 92), according to a second mode of operation. According to the second mode of operation, only the memory card 10 is plugged into PC 92. The compatible SIM card 86 resides in a mobile phone 94 and communicates with a server of service provider 84 via a cellular connection (independently from memory card 10). In this case, the memory card 10 is authorized by the server of service provider 84 using an Internet connection. For example, service provider 84 can update the user profile of memory card 10 via the Internet connection. Using the memory card as such spares the need of connecting the memory card 10 to SIM card 86 (for example, when the memory card 10 is ported from the mobile phone 94 to the PC 92).

In accordance with another embodiment, there is provided a method of a service provider for doing business by equipping a mobile phone with a secured card, configuring a memory card to operate conditional on an authentication from only this secured card and offering the mobile phone and the memory card for sale at a discount (i.e. either at a very low cost or at no charge at all). A service provider may cover the cost of the memory card (and also provide the memory card with preloaded data and applications) and by offering the mobile phones and the memory card for sale at a discount, for example, increase its sales by binding any usage of the memory card on payment to its MNO network.

It should be noted that the present invention relates to a memory card that is configured to be compatible with a corresponding SIM card. However, it can be understood that other implementations are possible within the scope of the invention, thus relating to any secure device, such as a RUIM (Removable User Identity Module), that is applicable to control operation of storage within the memory card in response to commands received from a server of a third party service provider.

Having described the invention with regard to a certain specific embodiment thereof, it is to be understood that the description is not meant as a limitation, since further modifications will now suggest themselves to those skilled in the art, and it is intended to cover such modifications as fall within the scope of the appended claims.

The invention claimed is:

1. A storage device comprising:
a memory including one or more secure portions; and
a controller coupled to the memory and configured to operatively interface with a device, the device further configured to interface an identity card, the controller further configured to:
send, to the device, an encrypted code to use a first key and a second key stored on the identity card in order for the storage device to allow access to the one or more secure portions, the first key and the second key being stored on the identity card prior to sending the encrypted code;
receive a response to the encrypted code, the response received solely via the device and being a derivative of the first key and the second key stored on the identity card, the derivative being a decryption of the encrypted code with the first key and then a reencryption with the second key;
decrypt the response;
determine whether the decrypted response matches the code; and
allow access to the one or more secure portions of the storage device in response to determining that the decrypted response matches the code and prevent access to the one or more secure portions in response to determining that the decrypted response does not match the code.

2. The storage device of claim 1, wherein the identity card is a SIM card.

3. The storage device of claim 1, wherein the identity card is a RUIM card.

4. The storage device of claim 1, wherein the controller is operative to control the access to the one or more secure portions of the memory according to a user profile.

5. The storage device of claim 4, wherein the storage device is configured for updating of the user profile by a service provider.

6. The storage device of claim 1, wherein the control of the access includes granting only read access.

7. The storage device of claim 1, wherein the control of the access includes controlling write operations.

8. The storage device of claim 1, wherein the control of the access includes granting both read access and write access.

9. The storage device of claim 1, wherein the device is a mobile phone.

10. The storage device of claim 1, wherein the identity card is interfacing with the device when the controller sends the encrypted data.

11. The storage device of claim 1, wherein the controller is further operative to encrypt, by the storage device, the code with a first key stored on the storage device prior to sending the code to the identity card; and
wherein the controller of the storage device is configured to decrypt the response from the identity card with a second key stored on the storage device prior to determining whether to authorize the identity card.

12. The storage device of claim 11, wherein the code comprises a random code.

13. The storage device of claim 1, wherein the controller is operative to determine whether to authorize the identity card by determining whether the identity card was initialized with the storage device.

14. The storage device of claim 1, wherein the controller is configured to send the communication conditional upon the storage device having been authorized by the identity card.

15. A method of controlling operation of a storage device, the method comprising:
in the storage device:
sending, to a device, an encrypted code to use a first key and a second key stored on an identity card in order to allow access to one or more secure portions of the storage device, the storage device operatively interfacing with the device, the device configured to interface with the identity card, the first key and the second key being stored on the identity card prior to sending the encrypted code;
receiving a response to the encrypted code, the response received solely through the device and being a derivative of the first key and the second key stored on the identity card, the derivative being a decryption of the encrypted code with the first key and then a reencryption with the second key;

decrypting the response;

determining whether the decrypted response matches the code; and allowing access to the one or more secure portions of the storage device in response to determining that the decrypted response matches the code and preventing access to the one or more secure portions in response to determining that the decrypted response does not match the code.

16. The method of claim 15 wherein the identity card is of a service provider; and wherein allowing access is effected according to a user profile.

17. The method of claim 16 further comprising:

updating, by the storage device, the user profile.

18. The method of claim 17, wherein the updating is effected via wireless communication.

19. The method of claim 15, wherein allowing of the access is limited to the one secure portion.

20. The method of claim 15, wherein the identity card is interfacing with the device when the storage device sends the encrypted data to.

21. The method of claim 15, further comprising encrypting, by the storage device, the code with a first key stored on the storage device prior to sending the code to the identity card; and wherein decrypting the response from the identity card is with a second key stored on the storage device prior to determining whether to authorize the identity card.

22. The method of claim 21, wherein the code comprises a random code.

23. The method of claim 15, wherein determining whether to authorize the identity card includes determining whether the identity card was initialized with the storage device.

24. The method of claim 15, wherein sending the communication in order to authorize the identity card is conditional upon the storage device having been authorized by the identity card.

25. The storage device of claim 1, wherein the controller is configured to send the communication to the identity card via the device in order for the identity card to decrypt and then reencrypt the communication; and wherein the response received comprises the reencrypted communication.

26. A storage device comprising:

a memory including one or more secure portions; and a controller coupled to the memory and configured to operatively interface with a device that is configured to interface with an identity card, the controller further configured to:

encrypt data with a first key;

send, to the device, the encrypted data to use keys stored on the identity card in order to authorize the identity card;

receive a response to the encrypted data, the response communicated solely through the device and being generated by decrypting and then reencrypting the encrypted data using the keys stored in the identity card;

decrypt the response using a second key;

determine whether the decrypted response matches the data; and allow access to the one or more secure portions of the storage device in response to determining that the decrypted response matches the data and prevent access to the one or more secure portions in response to determining that the decrypted response does not match the data.

27. The storage device of claim 26, wherein the first key and the second key were provided by a server.

* * * * *

UNITED STATES PATENT AND TRADEMARK OFFICE
CERTIFICATE OF CORRECTION

Page 1 of 1

PATENT NO.        : 8,787,973 B2
APPLICATION NO.   : 11/636540
DATED             : July 22, 2014
INVENTOR(S)       : Agami et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 346 days.

Signed and Sealed this
First Day of December, 2015

Michelle K. Lee
*Director of the United States Patent and Trademark Office*